US006710291B1

(12) United States Patent
Wegener et al.

(10) Patent No.: US 6,710,291 B1
(45) Date of Patent: Mar. 23, 2004

(54) FORMING PROCESS AND SYSTEM (75) Inventors: Konrad Wegener, Göppingen (DE); Hans Hofele, Göppingen (DE)

(73) Assignee: Schuler Pressen GmbH & Co., KG, Goeppingen (DE)

( * ) Notice: Subject to any disclaimer, the term of this patent is extended or adjusted under 35 U.S.C. 154(b) by 0 days.

(21) Appl. No.: 09/443,455

(22) Filed: Nov. 19, 1999

(30) Foreign Application Priority Data

Nov. 19, 1998 (DE) .......................... 198 53 366

(51) Int. Cl.[7] .................. B23K 26/00; B23K 26/14; B23K 26/16
(52) U.S. Cl. ................. 219/121.72; 219/64; 219/121.6; 219/121.63; 219/121.64; 219/121.67; 72/305.1
(58) Field of Search ................ 219/121.7, 121.72, 219/121.62, 121.82, 121.85; 72/405, 405.1

(56) References Cited

U.S. PATENT DOCUMENTS

| | | | | |
|---|---|---|---|---|
| 3,578,935 A | * | 5/1971 | Deane | 219/64 |
| 3,656,385 A | * | 4/1972 | Kimbrell | 83/290 |
| 4,201,905 A | | 5/1980 | Clark et al. | 219/121 |
| 4,665,607 A | | 5/1987 | Ressencourt | 29/568 |
| 4,698,480 A | * | 10/1987 | Klingel | 219/121.67 |
| 4,814,576 A | * | 3/1989 | Morita et al. | 219/121.6 |
| 4,947,014 A | | 8/1990 | Rolli et al. | 219/64 |
| 5,012,665 A | * | 5/1991 | Brandstetter | 72/405.13 |
| 5,140,839 A | * | 8/1992 | Bruns | 72/405.1 |
| 5,359,872 A | * | 11/1994 | Nashiki | 72/16.1 |
| 5,380,978 A | * | 1/1995 | Pryor | 219/121.64 |
| 5,500,507 A | * | 3/1996 | Yoshiaki | 219/121.82 |
| 5,597,433 A | * | 1/1997 | Dyble et al. | 156/203 |
| 5,782,129 A | * | 7/1998 | Vanderzee et al. | 72/405.1 |
| 5,842,370 A | * | 12/1998 | Hofele et al. | 72/405.09 |
| 5,876,550 A | * | 3/1999 | Feygin et al. | 156/264 |
| 5,961,858 A | * | 10/1999 | Britnell | 219/121.63 |
| 6,515,256 B1 | * | 2/2003 | Battaglia | 219/121.72 |

FOREIGN PATENT DOCUMENTS

| | | | |
|---|---|---|---|
| DE | 120 133 | 6/1975 | |
| DE | 34 10 913 | 10/1985 | |
| DE | 38 32 499 | 3/1990 | |
| DE | 41 28 194 | 3/1993 | |
| DE | 42 28 528 | 3/1993 | |
| DE | 44 25 033 | 1/1996 | |
| EP | 0008773 A1 * | 1/1980 | 219/121 |
| EP | 0 439 684 | 8/1991 | |
| EP | 0 530 383 | 3/1993 | |
| EP | 0 615 799 | 9/1994 | |

* cited by examiner

Primary Examiner—L. Edmondson
(74) Attorney, Agent, or Firm—Crowell & Moring LLP (57) ABSTRACT

A process forms workpieces in a forming system with at least one forming station. The workpieces are transported from or to the at least one forming station. Outside the time period provided for the forming of a certain workpiece, a machining takes place in the forming system with a local energy feed on this workpiece.

23 Claims, 7 Drawing Sheets

FORMING PROCESS AND SYSTEM

BACKGROUND OF THE INVENTION

This application claims priority of DE 198 53 366.7, filed Nov. 19, 1998, the disclosure of which is expressly incorporated by reference herein.

The present invention relates to a process for forming workpieces in a forming system having at least one forming station. Furthermore, the invention relates to an improved system for implementing the foregoing type of process.

Forming processes and the related forming systems are known, for example, from EP 04 39 684 B1 and EP 05 47 190 B1 as well as from DE 38 32 499 A1 and DE 39 05 069 A1. As a rule, these processes produce relatively large-surface workpieces from sheet metal plates by the varied forming operations, such as pressing, cutting or deep-drawing. For producing such large-surface work pieces, very large and therefore very heavy forming tools are used in most cases. Such, which forming tools oscillate at a corresponding stroke rate and the pertaining speed for achieving a large piece number.

A disadvantage of the known processes is that the large mass of these forming tools has to be accelerated and braked during each stroke, which consumes a lot of energy. Another disadvantage is the large expenditures of material and cost which are required for manufacturing the forming tools.

An even more serious problem concerns the very long development periods for the forming tools. For example, in the development of a motor vehicle, these development periods represent a very large fraction of the entire development time. Possible changes on the forming tools disadvantageously lead to high expenditures. In addition, the transportation of the workpieces from one forming station to the next is very time-consuming and causes unnecessarily high costs.

SUMMARY OF THE INVENTION

An object of the present invention is, therefore, to A provide a process and system for forming workpieces by way of which, as the result of reduced expenditures with respect to material and development, an identical or better forming result can be achieved than by means of known forming processes and systems. Furthermore, the largest possible amount of flexibility is to be achieved during the retooling, in that the adaptation to another product can take place as much as possible by means of reprogramming.

According to the invention, this object is achieved by a process in which outside the time period provided for the forming of a certain workpiece in the forming system, a machining with a local energy feed to this workpiece can be carried out.

As the result of the machining of the workpiece according to the invention with a local energy feed within the forming to the system outside the time provided for the forming, this step, which otherwise results in idle time, can be used advantageously for a machining of the workpieces. The flexibility of the entire forming process is increased in that the machining contour can be programmed. Furthermore, a very small mass must advantageously be moved in this case.

In the present context, a local energy feed means that the extent of the energy-affected zone or of the machining range without a relative movement for machining the workpiece is small in comparison to the dimension of the workpiece.

Constructive solutions for achieving the above object are in which at least one machining device with a local energy feed is arranged on a transport device for the workpiece wherein at least one machining device with a local energy feed is fixedly arranged in the forming system.

Both possibilities of the arrangement of the machining device according to the invention either on a transport device or directly within the forming system permit an easy implementation of the process according to the invention. As a result, one or several forming stations of the forming system can be eliminated, whereby considerable costs may be saved for the whole forming system. In addition, the space requirement for the forming system according to the invention is also reduced.

Concerning the general state of the art with respect to laser machining systems in machine tools, reference is made to DE 34 10 913 A1, DE 41 28 194 C2 and to EP 00 08 773 B1.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
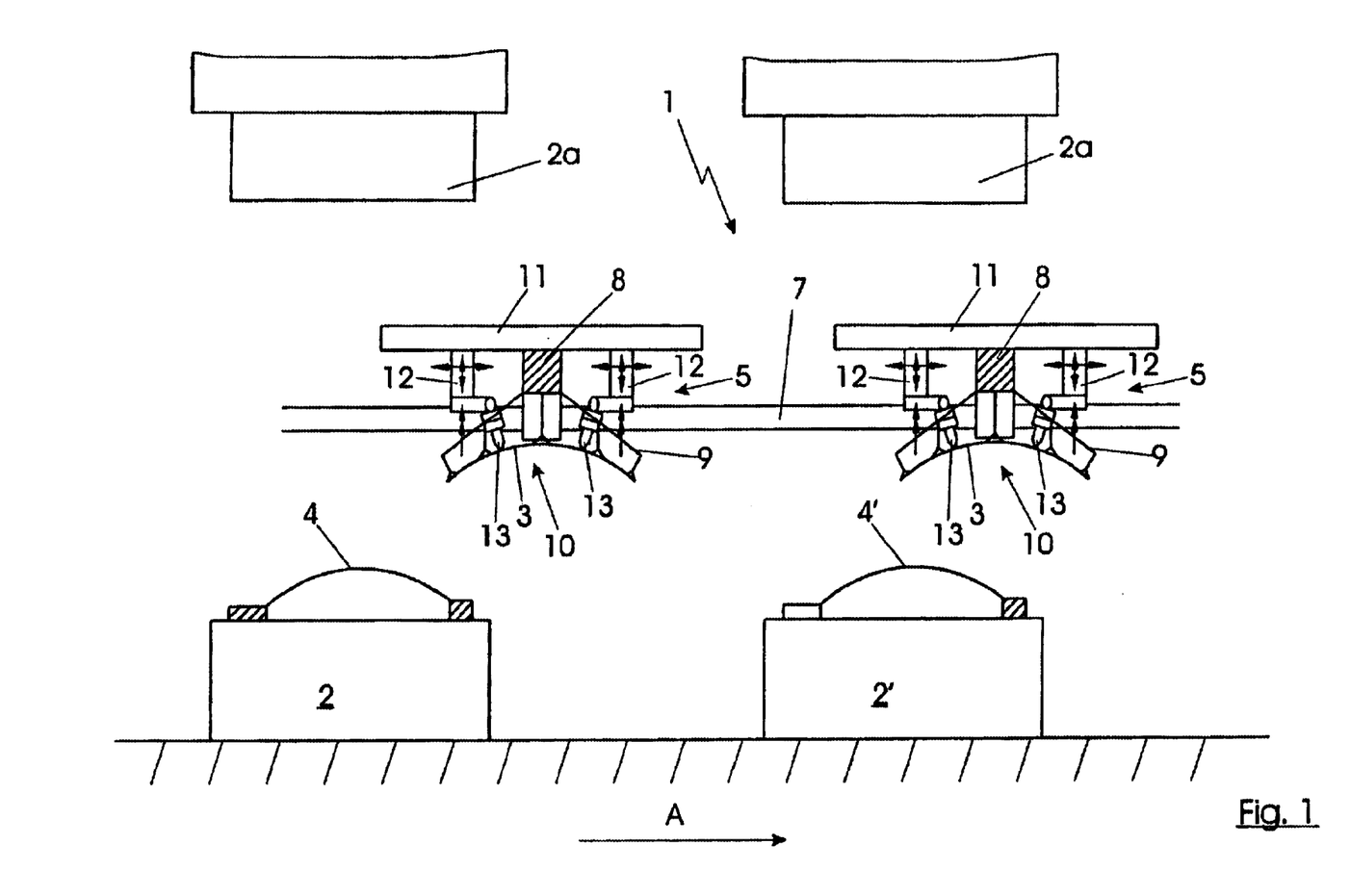
FIG. 1 is a schematic view of a first embodiment of a laser machining outside the forming process, the laser machining device being movable on additional axes which are arranged on a transport device for the workpieces.

FIG. 1 shows a portion of a forming system 1 which is composed of several forming stations 2 and can therefore also be called a multi-station forming system or a transfer press. A workpiece 3 is situated on a first depositing element 4 assigned to the first forming station 2 and is conveyed by a transfer or transport device 5 to a second depositing element 4' assigned to the second forming station 2'. The transport direction of the workpieces 3 inside the forming system 1 is marked by the arrow "A" in the figures. In a manner generally known per se, the workpieces 3 are machined in the forming system 1 by various forming processes, such as pressing, deep-drawing or bending in the corresponding forming stations 2. Of the forming stations 2, tool top parts 2a are also shown which are situated in the upper area of the forming stations 2.

The transport device 5 for the transport of workpieces 3 can be constructed, for example, as a system of several manipulation robots or as a programmable two-axis or three-axis system. In the following description, however, the transport device 5, which may also be driven by the drive of the forming system 1, need not be discussed in detail to understand the present invention.

Figure 2:
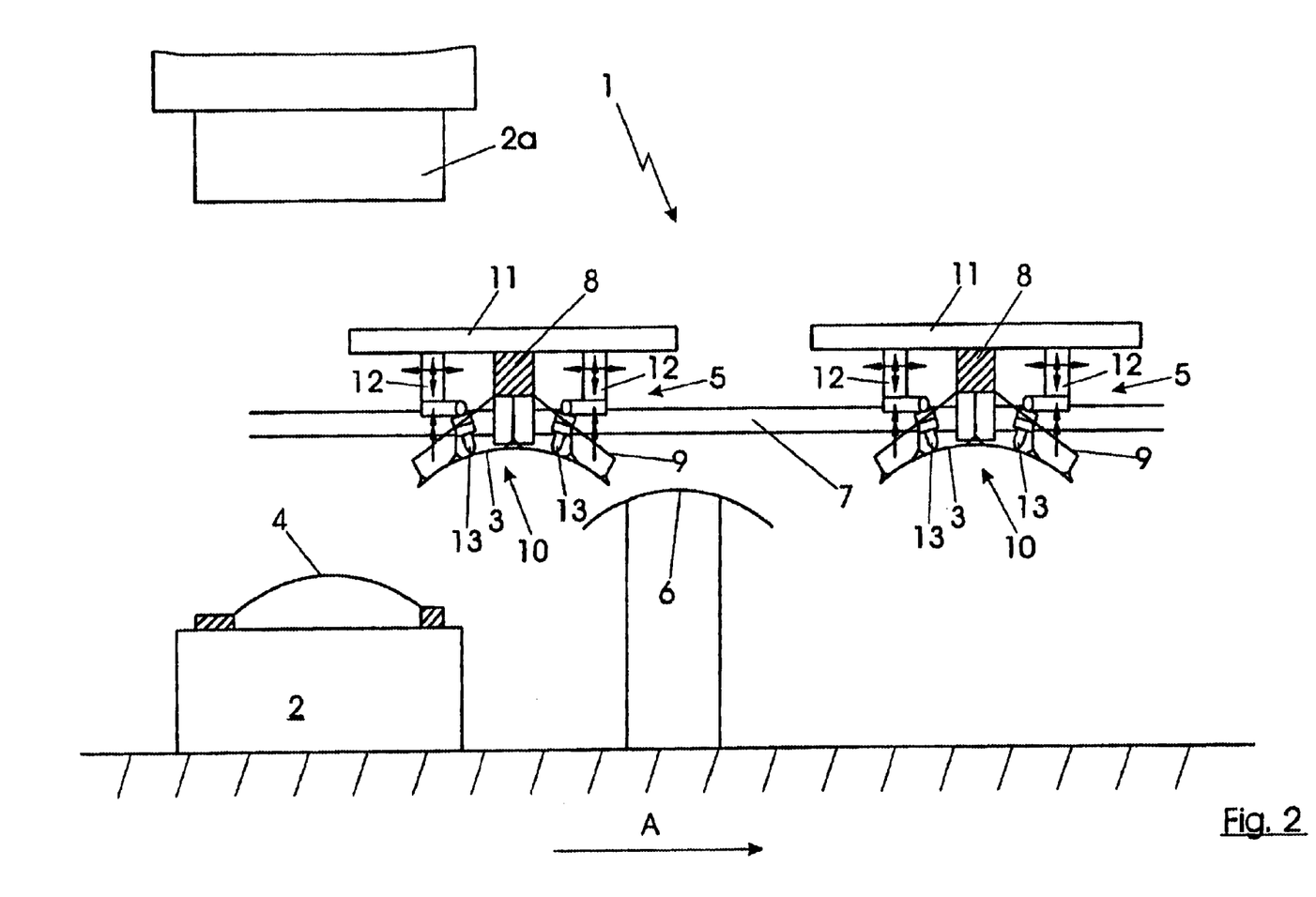
FIG. 2 is a schematic view of a second embodiment of a laser machining outside the forming process, including an intermediate depositing, the laser machining device being movable on additional axes which are arranged on the transport device for the workpieces.

In the embodiment according to FIG. 2, an intermediate depositing device 6, which is also known per se, is provided between the first depositing element 4 and the second depositing element 4'. The workpiece 3 is deposited on the intermediate depositing device 6 before being transported to the second depositing element 4'. The intermediate depositing device 6 can reorient the workpiece 3 for a machining in the second forming station 2' and may therefore also be called an orienting device. Furthermore, the intermediate depositing device 6 has the purpose of bridging the distance between the forming stations 2 and 2' in order to reduce the transport path times for the workpiece 3. The intermediate depositing device 6 is therefore also part of the transport device 5.

The transport device 5 has a stroke beam or a rail 7 as a guiding element which extends in the transport direction of the workpieces 3, and has suction bridges 8 moving on the rail 7. The suction bridges 8 are driven in a known manner and can therefore be moved on the rail 7. So-called suction spiders 9 are in each case mounted on the suction bridges 8 and hold the workpieces 3 by way of vacuum suction devices, clamping elements or magnetic force, and transferring them from the first forming station 2 (optionally by way of the intermediate depositing device 6) to the second forming station 2.'

On at least one of the suction bridges 8, a machining device 10 is mounted for the local energy feed into the workpieces 3. The machining device 10 is used for machining the workpiece 3 outside the time period during which they are machined in one of the forming stations 2, 2'. The machining devices 10 can be constructed as laser beam, water jet, plasma jet or sandblasting machining devices 10 or as machining devices 10 for feeding electromagnetic energy, for example, by way of induction or by way of conduction. All of the machining devices 10 described in the following, for the purpose of a simple description, are constructed as laser beam or laser machining devices 10.

For this purpose, beam-shaped guiding elements 11 are in each case mounted on the topside, thus the side of the suction bridges 8 facing away from the suction spiders 9. Two machining elements 13 constructed as laser heads are arranged by way of two manipulation devices 12 on the guiding elements 11. The manipulation devices 12 can be moved in a linear manner transversely to the transport direction of the workpieces 3 on the guiding elements 11 so that a type of cross slide block is created which carries the laser heads 13 which can be lifted, rotated and swivelled about two or more axes. Thus, the laser heads 13 can sweep over the entire double-curved surface of the workpieces 3. In a known manner which is not shown, the guiding elements 11 can also be moved transversely to the transport direction with respect to the suction bridges 8. Possibilities of moving the machining elements 13 by the manipulation device 12 are indicated by the orthogonal arrows.

The two manipulation devices 12 constructed in the form of swivel arm robots can be moved and swivelled independently of one another in all three directions in space, in order to be able to align the laser heads 13 in any desired position with respect to the workpiece 3 and to be able to machine also three-dimensionally formed workpieces by a corresponding relative movement to the workpiece 3. As will be explained below, this relative movement can also be achieved by a movement of the workpiece 3 with respect to the machining element 13.

Instead of the laser machining devices 10, water jet, plasma jet or sandblasting machining devices may also be provided, for which then, instead of the laser heads 13, corresponding machining tools or elements would be required for machining the workpieces 3 by water jets, plasma jets or sandblasting. In addition, machining elements 13 are contemplated for feeding of electromagnetic energy, for example, by way of induction or conduction. The machining elements 13 are generally used for locally feeding energy into the workpieces 3.

Thus, in the case of the laser machining device 10 described here, the laser heads 13 are provided for machining the workpiece 3, specifically in the form of a cutting, welding, application, removal machining or heat treatment. The corresponding type of laser head 13 can be used for each of the above-mentioned machining processes. This may, for example be an Nd-YAG laser or a $CO_2$ laser. The laser heads 13 are connected with a known type of stationary beam source. The beam source transmits the energy by way of known optical waveguides or mirror systems to the laser heads 13.

For machining the workpieces 3, the laser heads 13 move below the suction spider 9 along the workpiece 3. In this embodiment, for example, during the cutting by the laser heads 13, the cut is transmitted from one laser head 13 to the next laser head 13 if the movement is hindered by a part, for example, the suction bridges 8 or the suction spiders 9. Care must only be taken during the programming of the movement of the laser heads 13 that no other part of the forming system 1 can be damaged by the machining of the workpiece 3.

This machining of the workpieces 3 by the laser heads 13 is carried out during the transport step of the workpieces 3 by the transport device 5 from the first depositing element 4 to the second depositing element 4'. The conveying from the second depositing element 4' to another forming station 2 also takes place by a suction bridge 8 which has a laser machining device 10 and therefore permits a corresponding machining. A machining of the workpiece 3 will also be possible when this workpiece 3 is still or already resting on one of the depositing elements 4 or 4' or optionally 4".

In general terms, a certain workpiece 3 can be machined outside the time period provided for the forming of this workpiece 3, or in other words, always when the respective tool top part 3a makes it possible that the machining element 13 carries out a machining of the workpiece 3. of course, it is to be understood that the present invention contemplates that another workpiece 3 can be machined in a forming manner in another forming station, while a machining takes place on the workpiece 3 referred to above by means of the machining element 13. The reason is the phase offset between the individual forming stations 2, 2' of the forming system 1 which is generally known and therefore need not be discussed here.

In this context, the movement of the intermediate depositing device 6 can also be utilized for the machining operation by way of the laser machining device 10 and thus higher machining rates can be reached. Generally, a machining by the machining device 10 can be carried out by a relative movement between the suction bridge 8 and one of the depositing elements 4, 4' or the intermediate depositing device 6.

Figure 3:
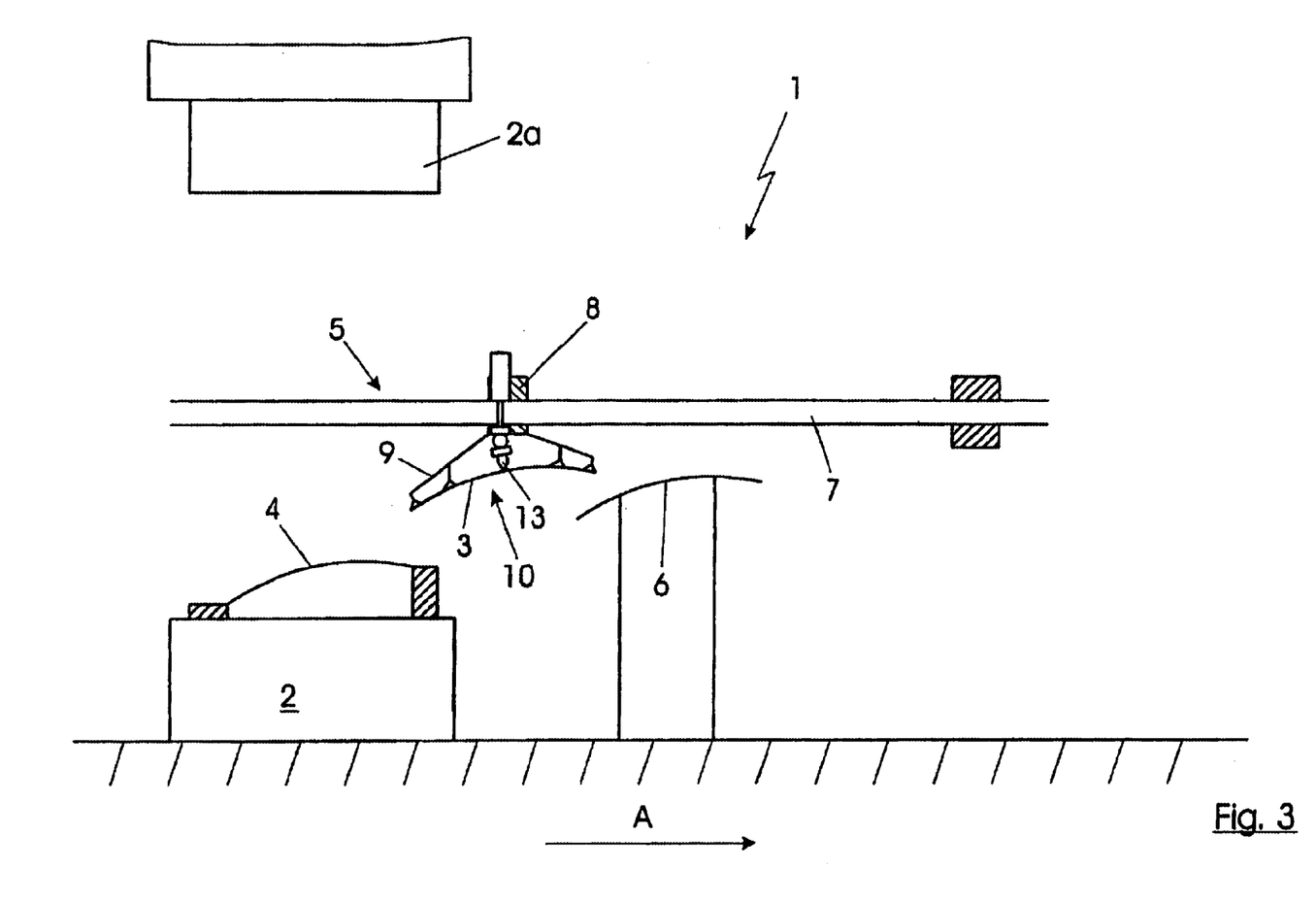
FIG. 3 is a schematic view of a third embodiment of a laser machining outside the forming process, including an intermediate depositing, the laser machining device being movable on additional axes which are arranged on the transport device for the workpieces.

FIG. 3 illustrates a simplified embodiment of the laser machining device 10, in which only one laser head 13, which has the same function as the above-described laser heads 13, is mounted directly on the suction bridge 8 or the suction spider 9 and can be moved in the longitudinal direction of the suction bridge 8. Because no separate manipulation device 12 is provided in this case, the laser head 13 itself is swivellably mounted on the suction spider 9 and the suction bridge 8 and can therefore also carry out a machining of the workpieces 3; i.e., along lines transversely to the transport direction, while the workpiece 3 hangs on the suction bridge 8, and along lines with components in the transport direction, while the workpiece 3 is deposited.

Figure 4:
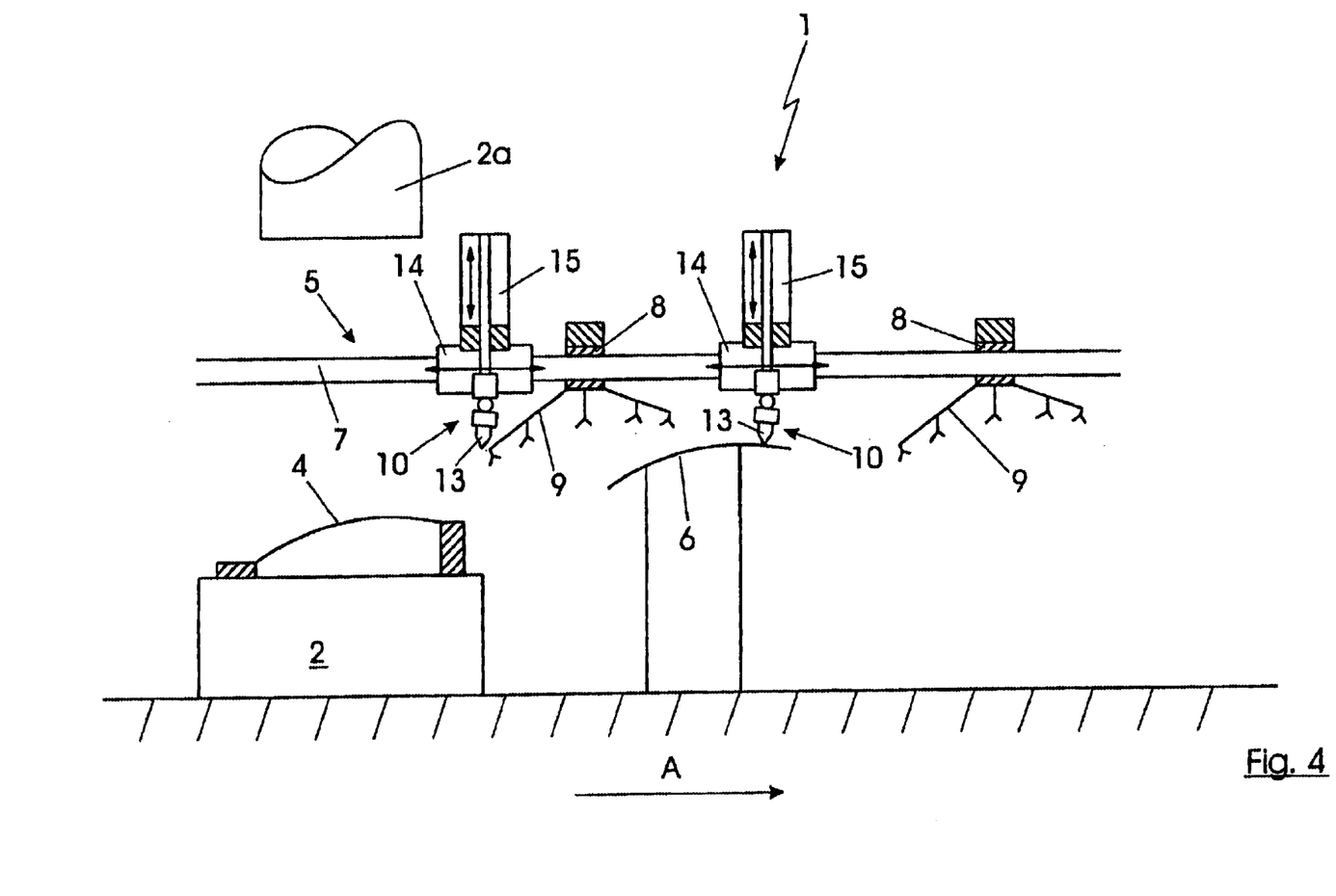
FIG. 4 is a schematic view of a fourth embodiment of the laser machining outside the forming process, the laser machining device being arranged on a common guide with the transport device for the workpieces, and the machining taking place on an intermediate depositing device required for the transport.

According to FIG. 4, the laser machining device 10 has two separate and mutually independently operable slide blocks 14 which are disposed on the same rail 7 as the suction bridges 8 and can be moved in the same manner. As the result, during the transport step of one of the workpieces 3, which as illustrated above is carried out by the suction bridges 9 mounted on the transport device 5, another workpiece 3 arranged on the depositing element 4, 4' or on the intermediate depositing device 6, as described above, can be machined by the laser heads 13 or the laser head 13 of the laser machining device 10. For this purpose, the laser head 13 is connected with the respective slide block 14 by way of an adjusting element 15 which is capable of moving the laser head 13 transversely to the transport direction and in the vertical direction. This movement is indicated by double-headed arrows. Here also, the relative movement between the machining element 13 and the workpiece 3 is again decisive for its machining.

In addition to being movable by way of the slide block 14 and the adjusting element 15, the laser head 13 on the laser machining device 10 can also be moved and swivelled in all directions in space, as in FIGS. 1 and 2. Naturally, the arrangement of two or more laser heads 13 on the slide block 14 is also contemplated. In this case, the machining of the workpiece 3 can also already take place while the workpiece 3 is still fixed on the suction bridge 8 and is moved along with it. Generally also in this case, as in all other embodiments, a machining outside the time period provided or required for the forming of the corresponding workpiece 3 can be carried out.

Figure 5:
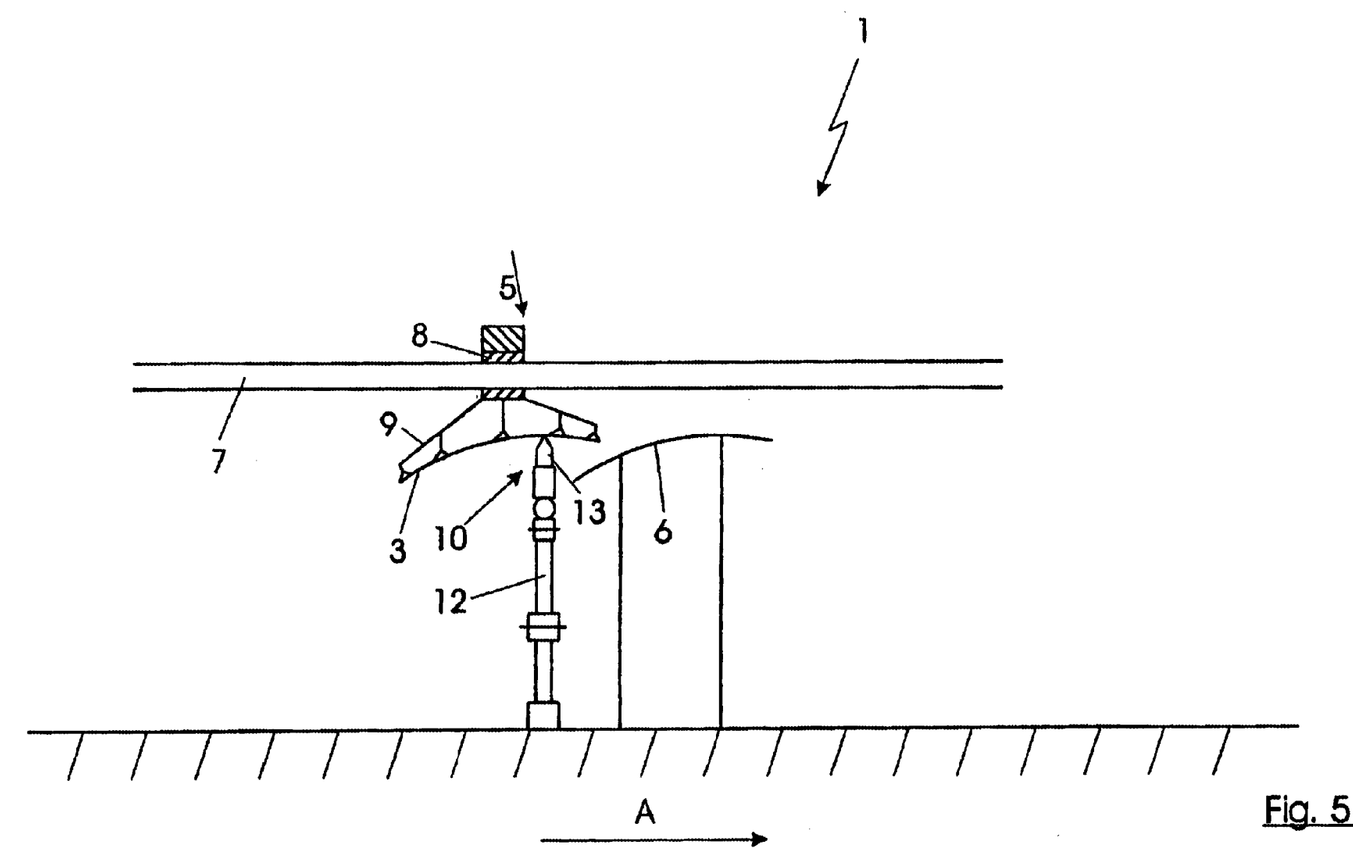
FIG. 5 is a schematic view of a fifth embodiment of a laser machining outside the forming process, the laser machining device being arranged on a manipulation device which is stationarily situated in the forming system.

In the embodiment illustrated in FIG. 5, the laser head 13 is arranged on a manipulation device 12, such as a swivel arm robot, situated directly in the forming system 1 and independent of the transport device 5. In this embodiment, the laser machining system 10 is therefore formed by the manipulation device 12 and the laser head 13. During the transport step of the workpieces 3 by way of the transport device 5 from the first depositing element 4 to the second depositing element 6, the laser machining device 10 can machine the workpiece 3 via the laser head 13. The laser head 13 can be moved by means of the swivel arm robot 12 in all three directions in space, and the laser head 13 can stand still in the transport direction, with only the transport movement of the workpiece 3. The resulting relative movement between the workpiece 3 and the machining element 13 can be utilized for machining the workpiece. A machining of arbitrarily shaped workpieces 3 is therefore achieved, in which, for example, bores can be placed in the workpiece 3 such that the bore may be non-circular before a subsequent forming but may be exactly round after the forming.

The forming system 1 generally operates by way of a certain cycle in order to produce the workpieces 3 and eject or discharge them from the last forming station 2. The cycle of the machining of the workpieces is a regular sequence of machining operations. This cycle relates to the entire forming system 1, in which a certain phase offset exists between the individual forming stations 2 and the machining devices 10, as mentioned above. All of the above-described machining devices 10 can also operate in this cycle of the forming system 1 and can therefore be integrated completely without any problems in the forming system 1 and in the forming process carried out thereby.

Figure 6:
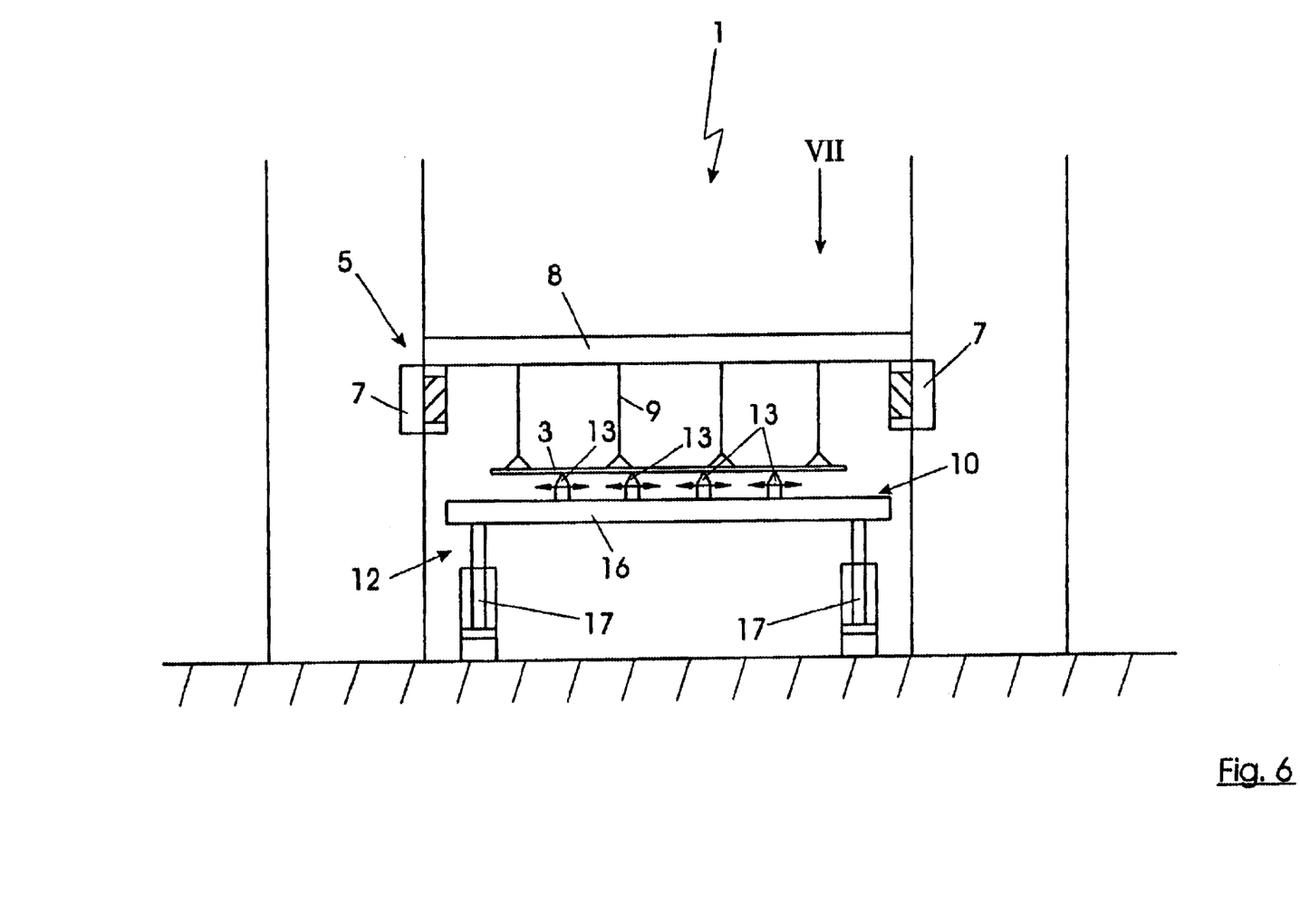
FIG. 6 is a schematic view of a sixth embodiment of a laser machining of plane blanks outside the forming process, the laser machining device being fixedly arranged in the forming system.

In FIG. 6, a workpiece 3 constructed as a plane blank is moved past laser heads 13 which are arranged only on a two-dimensionally acting manipulation device 12. The manipulation device 12 consists of a cross traverse 16 with laser heads 13 as well as in the present case of stroke elements 17 which are constructed as stroke cylinders and which provide the vertical adjustment of the cross traverse 16. The laser machining device 10 therefore comprises the laser heads 13 and the manipulation device 12 with the cross traverse 16 and the stroke elements 17. In this case, the laser heads 13 can be moved by known types of adjusting devices transversely to the transport direction of the workpieces 3, as illustrated by the double-headed arrows.

Thus, it is possible to carry out a laser machining during the transport step by the transport device 5 which also in this case provides the movement of the workpieces 3. Such a machining makes sense particularly during the insertion of the workpieces 3 or for other plane cuts. The above-mentioned adjusting devices for the laser heads 13 may, for example, be linear guides, whereby a fast adjustment of the laser heads 13 would be ensured. Naturally, instead of the stroke cylinders, other stroke elements 17, such as an electric motor and a pertaining spindle, can be used in order to permit a vertical adjustment of the cross traverse.

Figure 7:
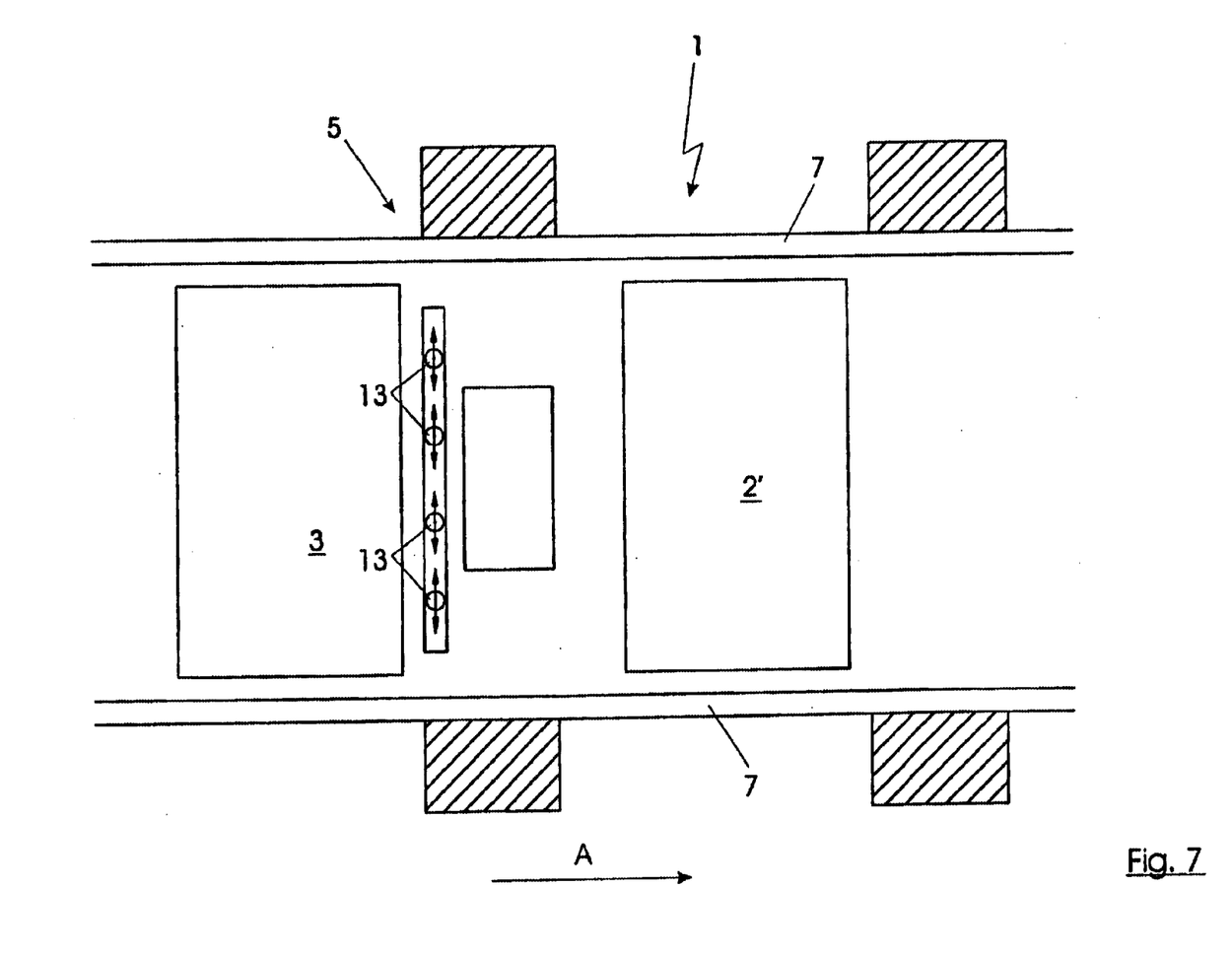
FIG. 7 is a top view of the laser machining device of FIG. 6 in the direction of arrow VII.

FIG. 7 is a top view of the laser machining device 10 illustrated in FIG. 6. The displaceability of the leaser heads 13 in the transverse direction of the transport device is also visible. In the case of very simple, straight cuts on the workpieces 3, such a transverse movement can also be eliminated and the laser heads 13 can be mounted completely rigidly on the manipulation device 12. Particularly in the case of a series-type machining, an elimination of the stroke elements 17 can also be achieved, because the position of the laser heads 13 could then be configured completely with respect to the workpieces 3. In addition, the cross traverse 16 with the linear guide can be constructed to be also not liftable when the laser heads 13 are each individually arranged on movable stroke elements. For achieving different cut geometries in the workpieces 3, only a corresponding programming of a control unit, of the forming system 1 is required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for forming workpieces in a multi-station press system which has at least two press stations and optionally an intermediate depositing device, comprising transporting the workpieces from or to each of the press stations and the optional intermediate depositing device, and, during transport of a particular workpiece within the multi-station press system, carrying out an energy beam machining of the particular workpiece during the transport thereof or when resting on the intermediate depositing device with a local energy beam device movable in at least one linear direction and tiltable so as to produce an energy beam substantially perpendicular to curved surfaces of the particular workpiece.

2. The process according to claim 1, wherein the beam machining of the workpiece is a laser beam machining, a plasma jet machining, a water jet machining or a sandblasting machining.

3. The process according to claim 1, wherein the energy beam machining of the workpiece comprises welding machining, cutting machining, and removal machining.

4. The process according to claim 1, wherein the machining of the workpiece comprises a feeding of electromagnetic energy into the workpiece.

5. The process according to claim 1, wherein the multi-station press system operates at a predetermined cycle, with the machining of the workpiece being carried out with a local energy feed in the predetermined cycle.

6. The process according to claim 1, wherein the machining of the workpiece is carried out while the workpiece is situated in the area of one of the press station.

7. The process according to claim 6, wherein during the machining in the area of the one press station, the workpiece is situated on the intermediate depositing device.

8. A process for forming workpieces in a forming system which has at least one forming station, comprising transporting the workpieces from or to the at least one forming station, and, during transport of a particular workpiece within the forming system, carrying out an energy beam machining of the particular workpiece with a local energy beam device movable in at least one linear direction and tiltable so as to produce an energy beam substantially perpendicular to curved surfaces of the particular workpiece, wherein during the machining in the area of the forming station, the workpiece is situated on an intermediate depositing device.

9. The process according to claim 8, wherein the intermediate depositing device is moved for machining the workpiece.

10. A multi-station press system for forming sheet metal workpieces, comprising at least two press stations and optionally an intermediate depositing device configured to produce three-dimensional contours in the sheet metal workpieces, means for transporting the workpieces from and to each of the press stations and the optional intermediate depositing device, and at least one machining station with an energy beam device for local energy feeding arranged inside the forming system and on a transport device for the sheet metal workpieces and configured to operate in a workpiece during the transport thereof or while resting on the intermediate depositing device such that the energy beam device is movable in at least one linear direction and is tiltable so as to produce an energy beam substantially perpendicular to curved surfaces of the workpieces.

11. A multi-station press system for carrying out a process of forming sheet metal workpieces, comprising at least two press stations and optionally an intermediate depositing device configured to produce three-dimensional contours in the sheet metal workpieces, means for transporting the workpieces from or to press stations and the optional intermediate depositing device, and at least one machining station having an energy beam device for local energy feeding arranged inside the forming system and configured to operate on a workpiece during transport thereof or while resting on the optional intermediate depositing device such that the energy beam device is movable in at least one linear direction and is tiltable so as to produce an energy beam substantially perpendicular to curved surfaces of the workpieces.

12. The system according to claim 10, wherein the machining station is provided with at least one machining element.

13. A multi-station press system for forming sheet metal workpieces, comprising at least one forming station configured to produce three-dimensional contours in the sheet metal workpieces, means for transporting the workpieces from and to the at least one forming station, and at least one machining station with an energy beam device for local energy feeding arranged inside the forming system and on a transport device for the sheet metal workpieces and configured such that the energy beam device is movable in at least one linear direction and is tiltable so as to produce an energy beam substantially perpendicular to curved surfaces of the workpieces, wherein the transport device has at least one rail and at least one suction bridge movably arranged on the rail, on which suction bridge the at least one machining station is mounted.

14. The system according to claim 13, wherein at least one machining station is mounted via a guiding element on the suction bridge.

15. The system according to claim 14, wherein at least one machining station is mounted on the guiding element via a manipulation device.

16. The system according to claim 10, wherein the means for transporting has at least one separate slide block on which the at least one machining station is mounted.

17. The system according to claim 16, wherein the at least one machining station is mounted on the slide block via an adjusting element, the at least one machining station being arranged to be movable via the adjusting element transversely to the transport direction of the workpiece.

18. The system according to claim 17, wherein the at least one machining station is mounted on a separate manipulation device in the multi-station press system.

19. The system according to claim 15, wherein the manipulation device is configured to be programmable.

20. A multi-station press system for forming sheet metal workpieces, comprising at least one forming station configured to produce three-dimensional contours in the sheet metal workpieces, means for transporting the workpieces from and to the at least one forming station, and at least one machining station with an energy beam device for local energy feeding arranged inside the forming system and on a transport device for the sheet metal workpieces and configured such that the energy beam device is movable in at least one linear direction and is tiltable so as to produce an energy beam substantially perpendicular to curved surfaces of the workpieces, wherein the means for transporting has at least one separate slide block on which the at least one machining station is mounted, the at least one machining station is mounted on the slide block via an adjusting element, the at least one machining stations being arranged to be movable via the adjusting element transversely to the transport direction of the workpiece, the at least one machining station is mounted on a separate manipulation device in the system, and the manipulation device has a cross traverse and at least one stroke element provided for vertical adjustment of the cross traverse.

21. The system according to claim 20, wherein the at least one machining station is arranged to be movable approximately perpendicularly to the transport direction constituting one of the linear directions.

22. The system according to claim 21, wherein the at least one machining station is arranged to be movable by a linear guide at least approximately perpendicular to the transport direction constituting one of the linear directions.

23. The system according to one of claim 10, wherein the at least one machining station comprises a laser head.

* * * * *